United States Patent [19]

Brambilla

[11] Patent Number: 5,589,744
[45] Date of Patent: Dec. 31, 1996

[54] SLEW RATE CONTROL CIRCUIT FOR A LOWSIDE DRIVER OF A DC MOTOR

[75] Inventor: Massimiliano Brambilla, San Jose, Calif.

[73] Assignee: SGS-Thomson Microelectronics, Inc., Carrollton, Tex.

[21] Appl. No.: 502,124

[22] Filed: Jul. 13, 1995

[51] Int. Cl.[6] ........................................ H02P 6/02
[52] U.S. Cl. ................................. 318/254; 318/138
[58] Field of Search .................... 318/138, 254, 318/245, 280–293; 307/270, 296 R, 299 B, 494; 327/399, 561, 407, 427, 108, 18, 72; 330/156, 260, 294; 379/400, 338; 369/43; 326/90, 31; 360/78.04; 331/2, 8; 341/118

[56] References Cited

U.S. PATENT DOCUMENTS

| | | |
|---|---|---|
| 3,818,246 | 6/1974 | Hellwarth et al. ................... 307/251 |
| 4,593,206 | 6/1986 | Neidorff et al. ..................... 307/270 |
| 4,674,119 | 6/1987 | Chea, Jr. ............................. 379/400 |
| 5,140,279 | 8/1992 | Scott, III ............................ 330/156 |
| 5,191,269 | 3/1993 | Carobolante ........................ 318/254 |
| 5,414,382 | 5/1995 | Larson et al. ...................... 327/561 |
| 5,430,400 | 7/1995 | Herlein et al. ..................... 327/108 |

Primary Examiner—Paul Ip
Attorney, Agent, or Firm—Joseph C. Arrambide; Theodore E. Galanthay; Lisa K. Jorgenson

[57] ABSTRACT

A circuit for controlling the slew rate at a motor coil during turn-on in a commutation sequence is disclosed. The disclosed circuit includes a comparator for comparing the output of error amplifier to the input of the input buffer amplifier. The comparator connects the output of the error amplifier to the input of the buffer amplifier only after the input has been charged at a controlled rate. The integrating buffer amplifier includes an amplifier with a feedback capacitor, and a current source connected at its input, for reducing the voltage slew rate during turn-on of the transistor.

20 Claims, 2 Drawing Sheets

SLEW RATE CONTROL CIRCUIT FOR A LOWSIDE DRIVER OF A DC MOTOR

This invention is in the field of motor control circuits, and is more particularly directed to the control of drive signals applied to motors.

BACKGROUND OF THE INVENTION

Modern polyphase DC motors have become commonplace in precision equipment such as hard disk drives of modern personal computer and workstation equipment, where the requirements of positional accuracy and operational speed are quite stringent. As a result, control circuitry for such motors has become quite sophisticated in ensuring rapid and uniform drive of the disk drive motors. "Glitches" and other nonlinearities such as torque ripple are highly undesirable in the drive of these motors, as they reduce motor performance, increase undesired acoustical noise, and increase the rate of motor wear.

Conventional polyphase DC motors are powered by the application of current to one or more selected stator coils of the motor according to a predetermined sequence to produce a varying magnetic field that rotates a permanent magnet rotor. The sequence in which the current is applied to the stator coils is generally referred to as the commutation sequence, as the drive current is commutated among the various stator coils in the sequence. This commutation produces electrical transients, however, as a result of the inductive nature of the stator coils; these transient effects are manifest in non-uniformity (i.e., "ripple") in the torque applied to the motor, and also in electromagnetic interference ("EMI") generated by the commutation.

Various techniques have previously been used to reduce the electrical transients from commutation, and thus reduce torque ripple and EMI. One such technique is described in U.S. Pat. No. 5,191,269, issued Mar. 2, 1993, assigned to SGS-THOMSON Microelectronics, Inc. and incorporated herein by this reference. In this technique, a current integrator is used to control the gates of field-effect drive transistors in such a manner as to reduce the slew rate, or time rate of change of voltage, at the stator coil when the drive transistor for that coil is turned off. Another such technique is described in U.S. Patent application Ser. No. 08/315,766 and is also incorporated herein by reference. In this technique, a current mirror is add additional control to the slew rate.

Referring now to FIG. 1, the motor drive circuitry in this prior arrangement will now be described in detail. Motor 10 includes stator coils 4A, 4B, 4C, through which current is driven in operation of the motor to turn the rotor (not shown). Each of stator coils 4A, 4B, 4C is connected to the drain of a corresponding field-effect drive transistor 8A, 8B, 8C, respectively, at nodes A, B, C. In this example, center tap CT of motor 10 is biased to $V_{cc}$ through transistor 9 (while line UNI is maintained high), and as such drive transistors 8A, 8B, 8C are "low-side" drivers, as they control the current conducted to ground through its corresponding stator coil 4A, 4B, 4C. The sources of each of drive transistors 8A, 8B, 8C are connected in common to one end of a sense resistor 6, which has its other end connected to ground.

The gates of drive transistors 8A, 8B, 8C in this prior arrangement are driven by a buffer amplifier 12A, 12B, 12C under control of an error amplifier 2 that is implemented, in this example, as an operational transconductance amplifier (OTA). The output of error amplifier 2 is connected to switches 5A, 5B, 5C, each of which are connected to the input of its corresponding respective buffer amplifier 12A, 12B, 12C. Switches 5A, 5B, 5C are controlled by a conventional commutation sequencer circuit (not shown) which produces an active signal on lines SWA, SWB, SWC, respectively, according to the desired commutation sequence. Error amplifier 2 receives a command signal on line IN, and a feedback signal on line FB from the top end of sense resistor 6, and produces an output current proportional to the differential voltage between the command signal on line IN and the sensed voltage on line FB (which corresponds to the sum of the drive currents through coils 4A, 4B, 4C). In this way, error amplifier 2 controls the drive of motor 10 according to an external control signal, with the balanced condition being that the feedback voltage on line FB, corresponding to drive current sensed by sense resistor 6, equals that commanded by the signal on line IN.

In operation, if stator coil 4A is to conduct current in a specific commutation phase, for example, line SWA will be driven high by the commutation sequencer, and lines SWB, SWC will be driven low. The output of error amplifier 2, indicating the amount of drive current to be driven to the selected stator coil 4, will then be applied to the input of buffer amplifier 12A, which in turn turns on low side drive transistor 8A to the extent indicated by error amplifier 2. Current will then be conducted from $V_{cc}$ through transistor 9, center tap CT and coil 4A to the extent allowed by drive transistor 8A. If the next commutation phase requires stator coil 4B to conduct rather than stator coil 4A, line SWB will be driven high and line SWA (and line SWC) will be driven low, turning on transistor 8B and turning off transistor 8A, thus conducting current through stator coil 4B rather than stator coil 4A. The sequence continues in the same manner, with stator coil 4C next conducting, to rotate the motor at the desired speed indicated by the command signal on line IN.

While this example illustrates operation of motor 10 in a unipolar mode, motor 10 may also or instead be driven in the well-known bipolar mode, in which center tap CT will not be driven and in which high-side driver transistors will drive each of nodes A, B, C in sequence in combination with low-side driver transistors 8A, 8B, 8C. In this mode, two stator coils 4 will be driven in each commutation phase, to the extent controlled by one of the drive transistors (generally the low-side drive transistors 8), with one stator coil 4 sourcing current toward center tap CT and with the other stator coil 4 sinking current therefrom.

In the arrangement of FIG. 1, as described in the above-incorporated U.S. Pat. No. 5,191,269, a current integrating function is provided to reduce voltage transients at nodes A, B, C that result when the corresponding respective drive transistor 8A, 8B, 8C is turned off in commutation. These transients result from the inability to instantaneously change the current through an inductor, such as through stator coils 4A, 4B, 4C. The current integrating is implemented by current sources 14A, 14B, 14C, each connected to the input of a corresponding respective buffer amplifier 12A, 12B, 12C, and by capacitors 7A, 7B, 7C connected between nodes A, B, and C, respectively, and the input to the corresponding buffer amplifier 12A, 12B, 12C, respectively. The effect of current sources 14 and capacitors 7 is to limit the voltage slew rate at nodes A, B, C when the corresponding drive transistor 8 is turned off.

In brief, referring by way of example to node A, the voltage $V_A$ at node A will obey the following relationship when transistor 8A is turned off:

$$\frac{\Delta V_A}{\Delta t} = \frac{i_{14A}}{C_7}$$

where $i_{14A}$ is the current sourced by current source 14A, and where $C_7$ is the capacitance of capacitor 7A. Accordingly, the provision of current sources 14 and capacitors 7 serve well to reduce the voltage slew rate at stator coils 4 during commutation.

Relative to the arrangement of FIG. 1, it has been observed, however, that voltage transients still remain to some extent at those nodes for which the corresponding drive transistor is turning on. FIG. 2 illustrates the operation of the circuit of FIG. 1 at the commutation between stator coil 4A being driven to stator coil 4B being driven. At time $t_0$, the voltage $V_A$ at node A is low, the voltage $V_B$ at node B is high, the current $I_A$ through stator coil $4_A$ is at a high level and the current $I_B$ through stator coil 4B is zero, given that transistor 8A is on and transistor 8B is off. The operation of sense resistor 6 with error amplifier 2 means that the drive currents are controlled so that the sum of the coil currents $i_A$, $i_B$, $i_C$ is constant ($i_C$ being zero in this example of commutation from coil 4A to coil 4B).

At time $t_1$, line SWA goes low and line SWB goes high, to turn off transistor 8A and turn on transistor 8B. Because of the reduced slew rate provided by current source 14A and capacitor 7A noted above, the voltage $V_A$ slowly ramps up toward its eventual high voltage, at a rate corresponding to the ratio $i_{14A}/C_7$, as noted above; qualitatively, the instantaneous current through stator coil 4A is absorbed by capacitor 7A in such a way as to prevent a positive-going voltage spike at node A at $t_1$.

However, since the current $I_B$ through stator coil 4B at time $t_0$ is zero, and since this current cannot instantaneously change at time $t_1$, transistor 8B will not be conducting current at such time as it is turned on at time $t_1$. In addition, the current provided at the output of error amplifier 2 is also quite large, and is substantially absorbed by capacitor 7B when switch 5B is turned on at time $t_1$. These events result in the drain voltage of transistor 8B immediately collapsing low due to the lack of drain-to-source current and to the rapid charging of capacitor 7B. This rapid transient results in significant ringing of the voltage $V_B$ at node B, as shown in FIG. 2, and thus in a significant amount of undesired electromagnetic interference (EMI).

SUMMARY OF THE INVENTION

It is therefore an object of the present invention to provide a circuit and method for reducing the turn-on transients in the commutation of a polyphase DC motor.

It is yet another objective to having a controlled slew rate which is independent of the error amplifier, and therefore totally controllable.

Other objects and advantages of the present invention will be apparent to those of ordinary skill in the art having reference to the following specification together with its drawings.

The present invention may be implemented by way of a circuit for controlling the slew rate at a motor coil during turn-on in a commutation sequence is disclosed. The disclosed circuit includes a comparator for comparing the output of error amplifier to the input of the input buffer amplifier. The comparator connects the output of the error amplifier to the input of the buffer amplifier only after the input has been charged at a controlled rate. The integrating buffer amplifier includes an amplifier with a feedback capacitor, and a current source connected at its input, for reducing the voltage slew rate during turn-on of the transistor.

DETAILED DESCRIPTION OF THE PREFERRED EMBODIMENT

Figure 2:
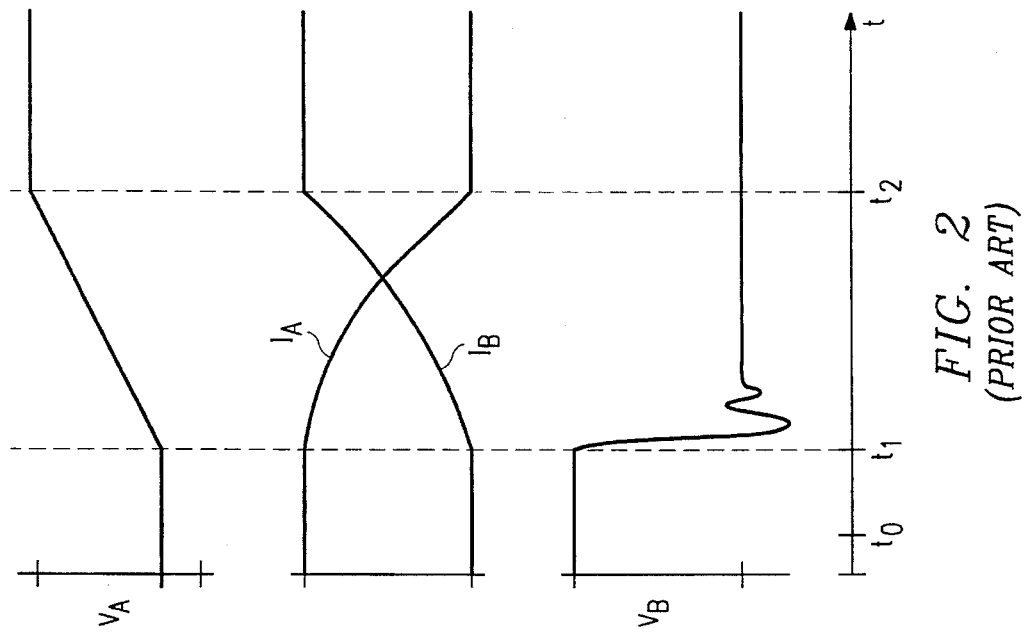
FIG. 2 is a timing diagram illustrating the operation of the circuit of FIG. 1.
Figure 1:
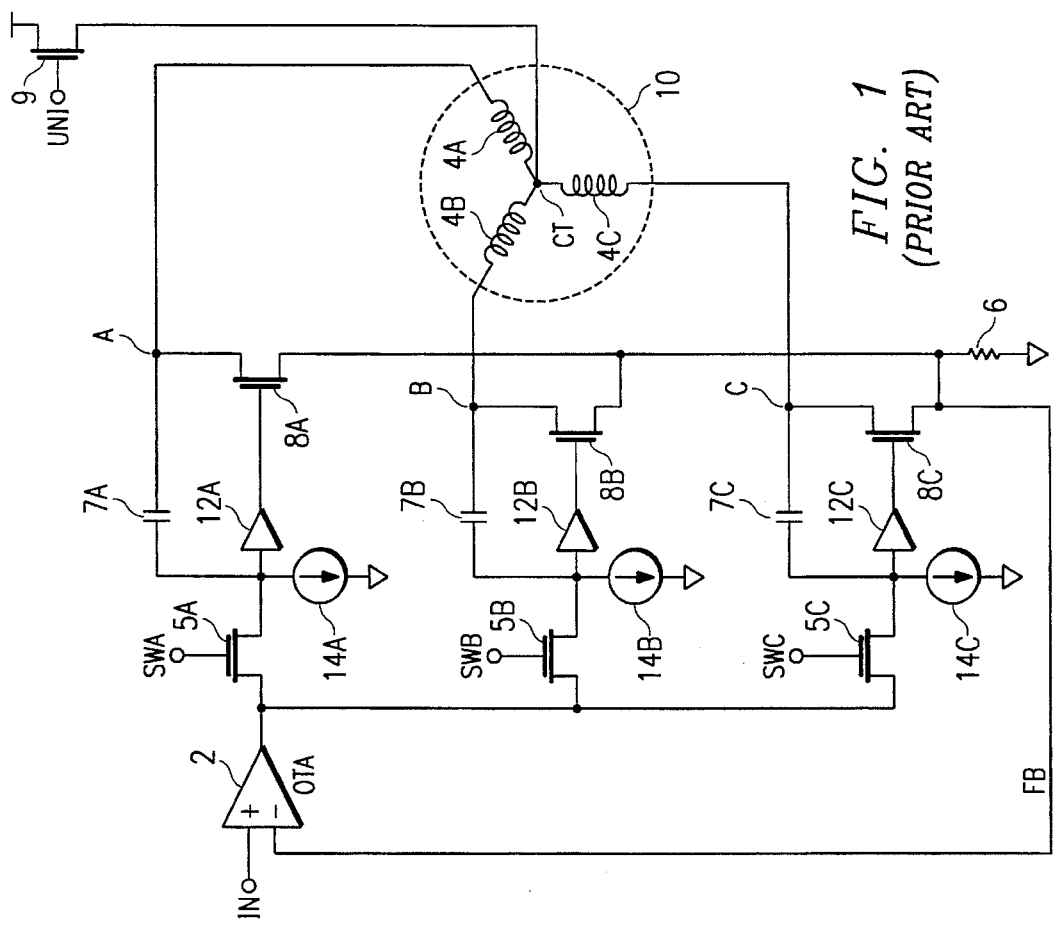
FIG. 1 is an electrical diagram, in schematic form, of a driver circuit for a polyphase DC motor according to the prior art.
Figure 3:
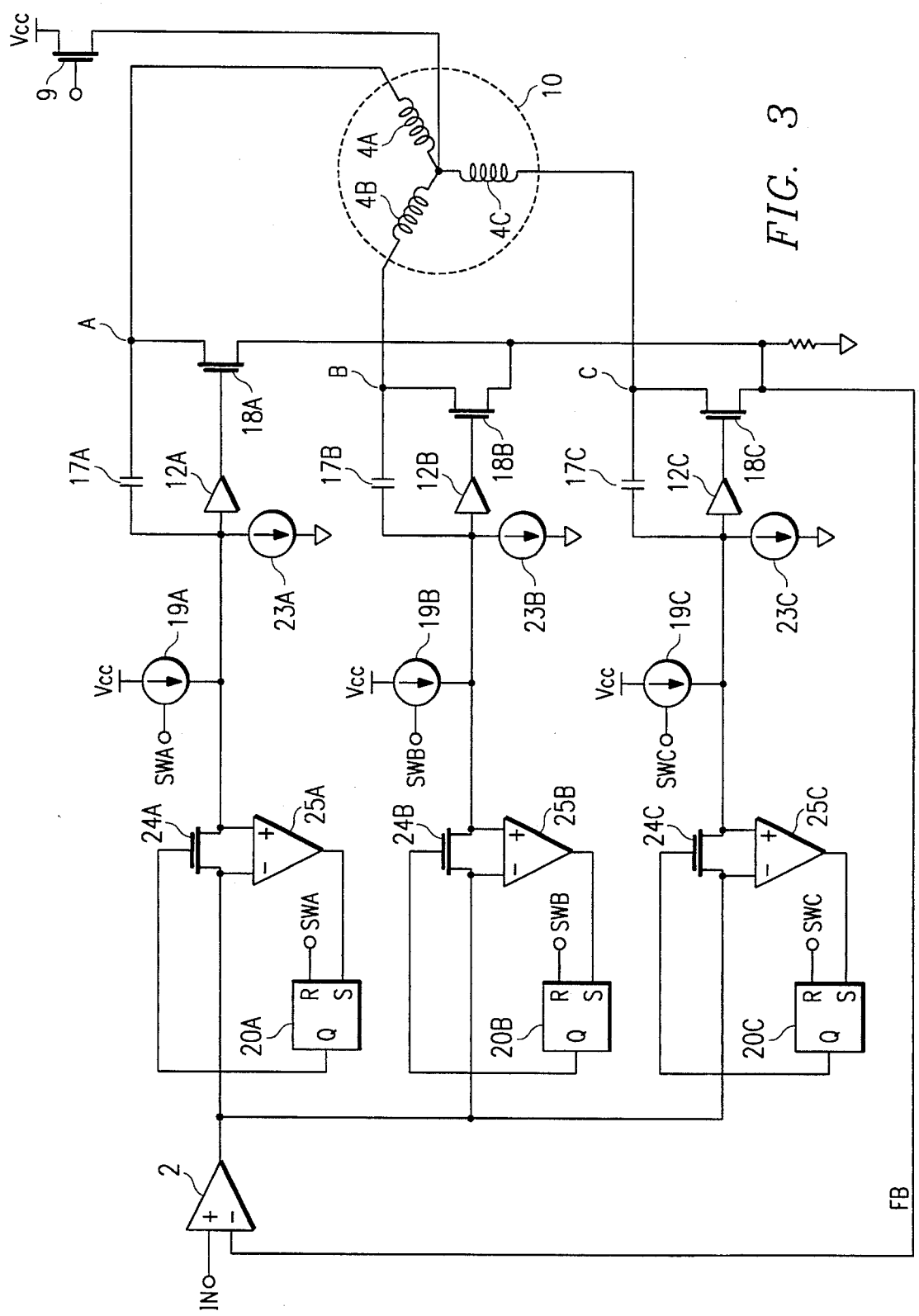
FIG. 3 is an electrical diagram, in schematic form, of a driver circuit for a polyphase DC motor according to the preferred embodiment of the invention.

Referring now to FIG. 3, a driver circuit for a polyphase DC motor according to the present invention will now be described in detail. This embodiment of the invention is directed to a three-phase DC motor configured in the well-known wye configuration, and which is driven by commutation of low-side drive transistors according to the well-known unipolar mode arrangement. It will be appreciated by those of ordinary skill in the art that other motor arrangements, including motors having more than three phases can also benefit from the present invention. In addition, as is well known in the art, polyphase DC motors are also operated in a bipolar mode in which two coils are driven, and thus in which both high-side and low-side drivers are provided for each coil; indeed, many motors can be driven in either mode, such as in a bipolar mode on startup and a unipolar mode after reaching a certain speed. It is contemplated that the present invention is also applicable to polyphase DC motors driven in bipolar mode, and that the present invention may be applied to control the high-side drive transistors instead of the low-side drive transistors as will be described herein below. It is further contemplated that these and other alternative embodiments of the present invention will be apparent to those of ordinary skill in the art having reference to this specification and its drawings.

In FIG. 3, motor 10 includes three stator coils 4A, 4B, 4C arranged in a wye configuration. Transistor 9 connects center tap CT to a high voltage $V_{cc}$ while in unipolar mode, which is indicated by line UNI at a high level to turn on transistor 9. Each stator coil 4A, 4B, 4C is connected to the drain of n-channel field-effect low-side drive transistor 18A, 18B, 18C, respectively, at corresponding respective nodes A, B, C; transistors 18 may alternatively be implemented as bipolar transistors, p-channel transistors, or the like. Sense resistor 6 is connected between ground and the commonly-connected sources of drive transistors 18A, 18B, 18C, to provide a feedback voltage on line FB corresponding to the sum of the drive currents through coils 4A, 4B, 4C.

Alternatively, sensing of the drive current through coils 4A, 4B, 4C for purposes of providing feedback control may be done by other techniques. For example, copending application Ser. No. 08/315,924 filed Sep. 30, 1994, entitled "Improved Current Sensing and Control in Brushless DC Motors" (Attorney's Docket No. 94-S-008), assigned to SGS-THOMSON Microelectronic's, Inc. and incorporating herein by this reference, describes a current mirror sensing technique for sensing the drive current in both bipolar and unipolar drive modes.

The gates of drive transistors 18A, 18B, 18C in this arrangement are driven by a buffer amplifier 12A, 12B, 12C. Detailed construction of an example of buffer amplifier 22 is described in the above-incorporated U.S. Pat. No. 5,191,269. As described therein and also hereinabove, a current integrating function is implemented by current sources 23A, 23B, 23C, each connected to the input of its respective buffer amplifier 12A, 12B, 22C, and by capacitors 17A, 17B, 17C connected between drive nodes A, B, C, respectively, and the input to the corresponding respective buffer amplifier 12A, 12B, 12C. As described above, current sources 23 and capacitors 17 limit the voltage slew rate at nodes A, B, C when the corresponding drive transistor 18 is turned off.

The motor driver of FIG. 3 also includes error amplifier 2, which receives a command signal from line IN at its non-inverting input, and the feedback voltage on line FB at its inverting input. According to this embodiment of the invention, the output of error amplifier 2 is applied to the input of buffer amplifiers 12A, 12B, and 12C through switching transistor 24A, 24B, and 24C, associated with stator coils 4A, 4B, 4C, respectively.

In operation, error amplifier 2 receives a command signal on line IN and a feedback signal on line FB from the top end of sense resistor 6, and produces an output proportional to the differential voltage between the command signal on line IN and the sensed voltage on line FB corresponding to the sum of the drive currents through coils 4A, 4B, 4C. When coil A is enabled by the commutation sequencer (which is not shown), the SWA signal will enable the switched current source 19A and reset flip-flop 20A. Transistor 24 will be held in a non-conducting state by flip-flop 20A. Therefore, current source 19A charges the input of buffer amplifier 12A at a controlled slew rate determined by:

$$dv/dt=(I_{19a}-I_{23A})/C_{17A}$$

When the voltage on the input of buffer amplifier reaches the output voltage of error amplifier 25A, the output of comparator 25A changes to a high voltage which sets the output of flip-flop 20A to a high voltage whereby driving transistor 24A into a state of conduction. With transistor 24A conducting, the loop is closed and error amplifier can regulate the current to coil 4A.

When the commutation sequencer deselects coil A and selects a coil B, the SWA signal turns switching current source 19A off and resets flip-flop 20A thereby turning transistor 24A to a state of non-conduction. This allows current source 23A to turn-off buffer amplifier 12A at a controlled slew rate. While coil 4A is being turned off, coil 4B is being turned on in the same manner as coil 4A described above. The flip-flop 20B is reset holding transistor 24B is a state of non-conduction. Switchable current source 19B is turned on and allowed to charge the input buffer amplifier 12B at a controlled slew rate. When the voltage on the input of buffer amplifier 12B reaches the output voltage of error amplifier 25B, the output of comparator 25B changes to a high voltage which sets the output of flip-flop 20B to a high voltage whereby driving transistor 24B into a state of conduction. With transistor 24B conducting, the loop is closed and error amplifier 2 can regulate the current to coil 4B. By way of example, current sources 19A, 19B, and 19C are typically 20 microamps, current sources 23A, 23B, and 23C are typically 5 microamps, and capacitors 17A, 17B, and 17C are typically 20 microfarads. Using these values, the disclosed invention provides the advantage of having a controlled slew rate which is independent of the error amplifier, and therefore totally controllable.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A driver circuit for a polyphase DC motor, comprising:

an error amplifier, for generating at an output drive signal responsive to a command input signal and to a feedback signal;

a plurality of coil drive circuits, each corresponding to a coil of the motor, each coil drive circuit comprising:
   a driver transistor having a conduction path connected to the corresponding coil, and having a control electrode;
   a buffer amplifier having an input, and having an output coupled to the control electrode of the driver transistor;
   a capacitor coupled between the input of the buffer amplifier and the conduction path of the driver transistor;
   a first current source connected to the input of the buffer amplifier, for conducting a first current;
   a switched current source, having a control electrode for receiving a commutation signal, for conducting a second current;
   a switched transistor having a current path between the output of the error amplifier and the input of the buffer amplifier, the switched transistor having a control element,
   an operational amplifier having an first input connected to the output of the error amplifier, having a second input connected to the input of the buffer amplifier, and having an output, and
   a flip-flop having a first input connected to the output of the operational amplifier, having a second input for receiving the commutation signal, and having an output connected to the control element of the switched transistor.

2. The driver circuit of claim 1, wherein the operational amplifier is a comparator.

3. The driver circuit of claim 1, wherein the flip flop is a RS flip flop.

4. The driver circuit of claim 1, wherein the switched transistor is of the field-effect type.

5. The driver circuit of claim 4, wherein the switched transistor is a MOSFET transistor.

6. The driver circuit of claim 1, wherein the switched transistor is a N-channel MOSFET transistor.

7. The driver circuit of claim 1, further comprising:

a sense resistor, connected between the conduction paths of each of the plurality of driver transistors and a reference voltage;

wherein the feedback signal corresponds to the voltage across the sense resistor.

8. A method of controlling a slew rate of a driver circuit during commutation, comprising the steps of:

isolating an input of a buffer amplifier from an output of a error amplifier;

controlling the slew rate at the input of the buffer amplifier;

comparing the voltage at the input of a buffer amplifier to the output of the error amplifier; and connecting the output of the error amplifier to the input of the buffer amplifier when the voltage at the input of the buffer amplifier is equal to the output of the error amplifier.

9. The method of claim 8, wherein the step of comparing the voltage is performed with an operational amplifier.

10. The method of claim 9, wherein the operational amplifier is a comparator.

11. A driver circuit for a polyphase DC motor, comprising:

an error amplifier, for generating at an output drive signal responsive to a command input signal and to a feedback signal;

a plurality of coil drive circuits, each corresponding to a coil of the motor, each coil drive circuit comprising:

a driver transistor having a conduction path connected to the corresponding coil, and having a control electrode;

a buffer amplifier having an input, and having an output coupled to the control electrode of the driver transistor;

a capacitor coupled between the input of the buffer amplifier and the conduction path of the driver transistor;

a first current source connected to the input of the buffer amplifier, for conducting a first current;

a switched current source, having a control electrode for receiving a commutation signal, for conducting a second current;

a switched transistor having a current path between the output of the error amplifier and the input of the buffer amplifier, the switched transistor having a control element, a means for comparing two voltages having an first input connected to the output of the error amplifier, having a second input connected to the input of the buffer amplifier, and having an output, and a flip-flop having a first input connected to the output of the operational amplifier, having a second input for receiving the commutation signal, and having an output connected to the control element of the switched transistor.

12. The driver circuit of claim 11, wherein the means for comparing two voltages comprises comparator.

13. The driver circuit of claim 11, wherein the flip flop is a RS flip flop.

14. The driver circuit of claim 11, wherein the switched transistor is of the field-effect type.

15. The driver circuit of claim 14, wherein the switched transistor is a MOSFET transistor.

16. The driver circuit of claim 11, wherein the switched transistor is a N-channel MOSFET transistor.

17. A disk drive circuit having read/write heads, rotating media, a polyphase DC motor and a driver circuit for the polyphase DC motor comprising:

an error amplifier, for generating at an output drive signal responsive to a command input signal and to a feedback signal;

a plurality of coil drive circuits, each corresponding to a coil of the motor, each coil drive circuit comprising:

a driver transistor having a conduction path connected to the corresponding coil, and having a control electrode;

a buffer amplifier having an input, and having an output coupled to the control electrode of the driver transistor;

a capacitor coupled between the input of the buffer amplifier and the conduction path of the driver transistor;

a first current source connected to the input of the buffer amplifier, for conducting a first current;

a switched current source, having a control electrode for receiving a commutation signal, for conducting a second current;

a switched transistor having a current path between the output of the error amplifier and the input of the buffer amplifier, the switched transistor having a control element, an operational amplifier having an first input connected to the output of the error amplifier, having a second input connected to the input of the buffer amplifier, and having an output, and a flip-flop having a first input connected to the output of the operational amplifier, having a second input for receiving the commutation signal, and having an output connected to the control element of the switched transistor.

18. The driver circuit of claim 17, wherein the operational amplifier is a comparator.

19. The driver circuit of claim 17, wherein the flip flop is a RS flip flop.

20. The driver circuit of claim 17, wherein the switched transistor is of the field-effect type.

* * * * *